Nov. 25, 1930.  W. O. N. SÖDERQVIST  1,782,976
SPRING OPERATED SHADE ROLLER
Filed Oct. 29, 1929
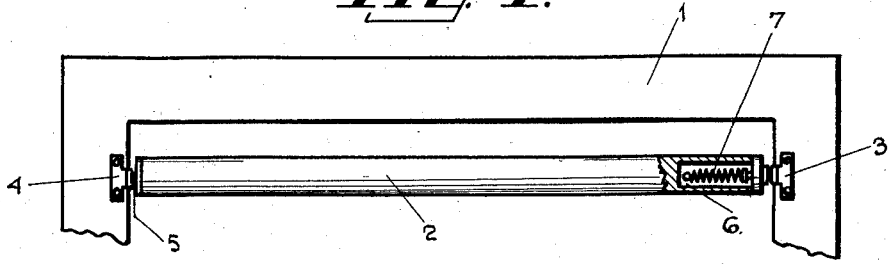
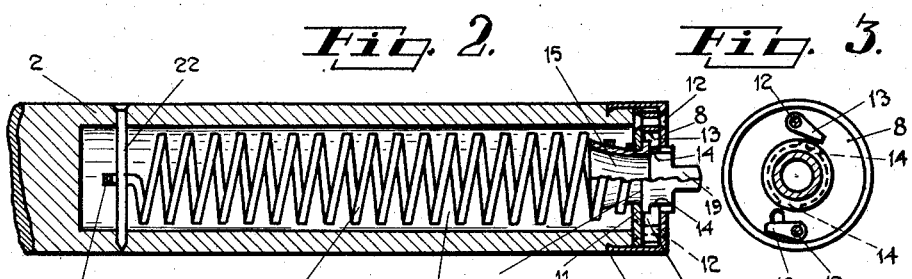
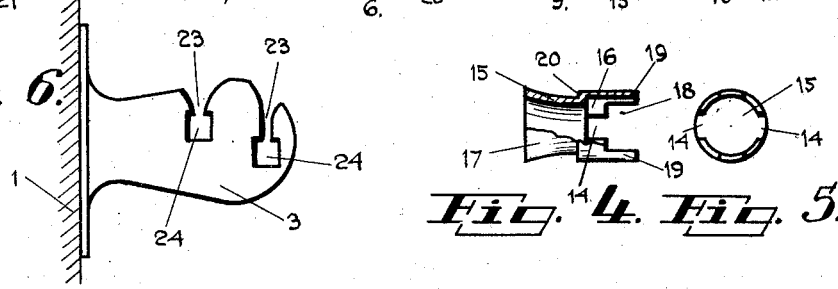
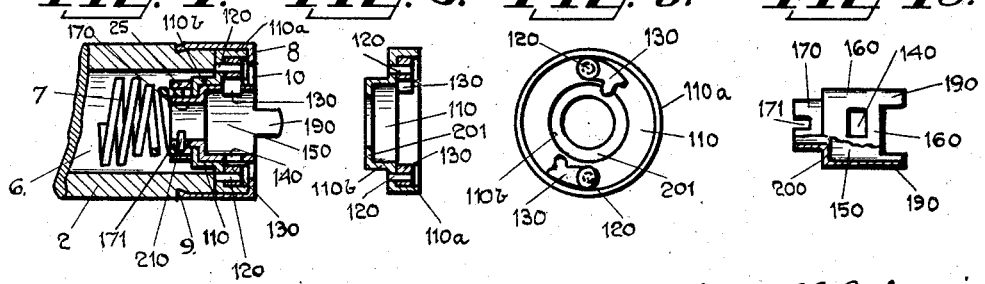
W. O. N. Söderqvist
INVENTOR
By Marks & Clerk
Attys.

Patented Nov. 25, 1930

1,782,976

UNITED STATES PATENT OFFICE

WILLIAM OSKAR NICOLAUS SÖDERQVIST, OF LIDKOPING, SWEDEN

SPRING-OPERATED SHADE ROLLER

Application filed October 29, 1929, Serial No. 403,230, and in Sweden November 6, 1928.

This invention refers to shade rollers of the class where the automatic winding of the roller is effected by a coil spring and the desired stop positions regulated by dogs which cooperate with notches in a stationary member.

The object of my invention is to provide an automatically operated shade roller of the class mentioned in which the spring motor with its fittings are of a very simple design which facilitates the construction as well as the maintenance of the roller and especially the assembling of the different parts.

The most characteristic feature of this invention, and which renders the device easy to manufacture, is that I have omitted the shaft or rod which in the various types of hitherto known shade rollers of this class constitutes the motor shaft. In my improved roller the spring motor operates without such a shaft and transmits its driving force directly from the parts which keep the one end of the spring stationary on to the roller proper.

In the accompanying drawing two embodiments of the invention are shown, which differ somewhat in the devices for attaching the spring to the stationary member.

In the drawing

Fig. 1 is a diagrammatical view partially in section of the entire roller suspended in a window casing showing the position of the spring motor within the roller but not the details of said motors nor of the stopping devices.

Fig. 2 is a longitudinal section of the motor end of the roller.

Fig. 3 is a plan view of cap closing the motor end of the roller and looked from inside.

Fig. 4 is a longitudinal view partially in section of an embodiment of the fixture of the stationary spring end.

Fig. 5 is an end view of the part shown in Fig. 4.

Fig. 6 is an elevation view of a suspension bracket for the roller.

Fig. 7 is in section a portion of the same roller end as in Fig. 2 but showing another embodiment of the invention.

Fig. 8 is a longitudinal section of a detail of the device in Fig. 7.

Fig. 9 is an end view of the part shown in Fig. 8 looked from the right hand of said figure.

Fig. 10 is a similar view as in Fig. 4 of a part having the same function in the embodiment in Fig. 7 as the aforesaid part in the embodiment in Fig. 2, and Fig. 11 is an end view of the coil spring showing how this spring may be attached to the part shown in Fig. 10.

In the drawing 1 designates the window casing and 2 the shade roller which is suspended in the casing 1 by means of brackets 3 and 4. The one end of the roller (the left hand end in Fig. 1) is provided with an axially projecting central pin 5 which is rotatable in a corresponding bore in the bracket 4 to allow the free revolving of the roller in said bracket such as usually known in this class of shade rollers. The opposite end of the roller 2 is provided with an axial boring 6 into which a coil spring 7 is housed. The boring 6 is closed at the end by a cap 8 fastened to the roller 2 in any convenient way for instance by squeezing the sharped edge 9 of the collar of the cap into the wooden roller 1. The cap 8 has a central aperture which is clearly visible in Fig. 7 at 10 but cannot be seen in Fig. 2 owing to its narrow fitting around the part embraced within said aperture.

I will now describe the embodiment shown in Figs. 2-5 inclusive. Behind the cap 8 spaced therefrom by a narrow interspace is an annular disc 11 which is attached to cap 8 by means of two diametrically opposed rivets 12. Said rivets serve also each as a pivot for a dog 13 which dogs cooperate with notches 14 in a central member 15.

The central member 15 can be described as composed of two coaxial hollow portions, the one 16 of which has a substantially cylindrical shape and the other 17 a bevelled shape. The cylindrical portion 16 has its shell cut through by two diametrically opposed slots 18 of a stepped configuration, the inner portions of said slots constituting the aforesaid notches 14. The pieces of the shell left between said slots 18 have the shape of two diametrically opposed and axially projecting tongues or lugs 19 as can be clearly seen in Fig. 2. The connection between the cylindrical portion 16 and the bevelled portion 17 forms a step or collar 20 which rests against the outside of the annular disc 11 whereby the flared end portion of bevel 17 serves as a stopper which prevents the member 15 to be drawn out to the right through the bore in the annular disc 11 while the collar 20 prevents a similar drawing out to the left causing a rigid attachment between member 15 and disc 11. When assembling these parts the portion 17 of member 15 from origin is cylindrical so that it can be passed through the boring in disc 11, and the left hand end of the portion 17 gets flared out afterwards.

The inner end of coil spring 7 is formed with a hook shaped bend 21, and a spike 22 is drawn in transversely through the roller 2 so that it passes through said hooked coil spring end 21, thereby anchoring the coil spring within the bore 6 of roller 2 whilst the outer end of the coil spring is somewhat reduced in width and wound around the bevelled portion 17 of member 15 before the flaring out of said portion has been carried out. The out flaring of portion 17 which can be effected for instance by means of a suitable tool inserted from outside into the boring of member 15 affords the fastening of spring 7 to member 15 as well as the aforesaid assembling of member 15 and disc 11.

The disc 11 serves also as a bearing for member 15 which can be revolved within said disc like a journal in its bearing. The bracket 3 at the motor end of roller 2 is provided with two vertically disposed slots 23 ending each into an enlargement 24, and through these slots the tongues 19 of member 15 are slid down so as to be housed each in its enlargement 24, when the roller becomes suspended in the window casing 1. The cooperation between the two slots 23 with their enlargements 24 and the tongues 19 prevents the revolving of member 15, and as a consequence the coil spring 7 will be twisted and compressed, if the roller 2 gets revolved, whereby the pin 5 in the left hand bracket 4 and the annular disc 11 around the member 15 serve as journals and bearings. When fast revolving the dogs 13 are slung out by the centrifugal force, but when stopping the rotation the one dog or the other as the case may be drops down, and its free end enters the nearest notch 14 thus locking the roller in the desired position as is very well known in shade rollers of the same class.

The other embodiment shown in Figs. 7 to 11 inclusive will now be described. The disparities are found in the method of assembling the coil spring 7 and stationary member 150, and the design of lastmentioned member.

The boring 6 in the roller 1 also in this embodiment of the invention is closed at the end by a cap 8 attached to the roller in the same way as in the aforesaid embodiment. Instead of the annular disc 11 there is a substantially cup shaped member 110 shown in detail in Figs. 8 and 9, which member consists in two cylindric portions the one 110$^a$ of substantially the same outer diameter as the inner diameter of cap 8, and the other portion 110$^b$ of substantially the same outer diameter as the inner diameter of boring 6. The bottom 201 of portion 110$^b$ forms a step or collar provided to cooperate with the rear surface 200 of a step of a stepped cylindrical member 150, clearly shown in Fig. 10, and which member substantially corresponds to the central member 15 of the preparatory described embodiment. The neck 170 of stepped member 150 is provided with a longitudinal slot 171 into which the radially inwards bent end 210 of coil spring 7 is inserted so as to twist the spring, (the inner end of which is anchored to roller 2 in substantially the same way as shown in Fig. 2) when the roller 2 is revolved around the stationary member 150.

Member 150 is kept stationary by means of tongues 190 projecting longitudinally from the larger cylindrical portion 160, which tongues 190 when the roller is in operative position in window casing 1 rest in the respective slots 23 with enlargements 24 in the right hand bracket 3, as shown in Fig. 6.

The cup shaped member 110 has two diametrically opposed rivets 120 which serve as pivots for dogs 130, which cooperate with notches 140 in member 150 similar to the dogs 13 and notches 14 in the aforesaid embodiment. A ring 25 embraces the end of coil spring 7 upon the neck 170 of member 150 and bears with its one edge against the bottom 201 of member 110 thus assembling members 110 and 150 in a rotatable manner.

Having thus described my invention and how it is to be performed, what I claim as new and want to protect by Letters Patent is:

1. A shade roller having a bore in one end, a coil spring in the bore having its inner end fixed to the roller, a cap closing the end of the bore, said cap having an aperture therein, a member rotatably engaged in said aperture and fixed to the outer end of the spring, said member having a step intermediate its ends, and means within the cap engaging the step to prevent axial movement thereof when the spring is under compression, as and for the purpose set forth.

2. A shade roller having a bore in one end, a coil spring in the bore, means for fixing the inner end of the spring to the roller, a cap closing the end of the bore and having an aperture therein, a sleeve rotatably engaged in the aperture and fixed to the outer end of the spring, said sleeve having spaced tongues upon its outer end and notches adjacent the tongues, dogs pivotally carried by the cap and engageable in the notches to retain the roller in adjusted position, said tongues being engageable with a bracket to retain the sleeve against rotation during winding of the roller.

3. A shade roller having a bore in one end, a coil spring in the bore, means for securing the inner end of the spring to the roller, a cap closing the end of the bore and having an aperture therein, a sleeve fixed to the outer end of the spring, said sleeve having a flared portion and a portion provided with notches, a step between the flared portion and the notched portion, dogs pivotally mounted on the cap for engagement with the notches, a disk confined within the cap and rotatably engaged on the sleeve, the step and flared portion serving to retain the sleeve against axial movement during rotation of the roller.

In testimony whereof I have affixed my signature.

WILLIAM OSKAR NICOLAUS SÖDERQVIST.